United States Patent [19]
Wilson et al.

[11] 3,877,639
[45] Apr. 15, 1975

[54] AUXILIARY AUTOMOBILE HEATER

[76] Inventors: Charles T. Wilson, 2765 N.E. 207th St., North Miama, Fla. 33160; George P. Wilson, 121 N. Fountain, Wichita, Kans. 67208

[22] Filed: May 24, 1974

[21] Appl. No.: 472,937

Related U.S. Application Data

[63] Continuation of Ser. No. 253,467, May 15, 1972, abandoned.

[52] U.S. Cl................ 237/12.3 C; 236/46; 236/51
[51] Int. Cl.............................................. B60h 1/22
[58] Field of Search ................ 237/12.3 B, 12.3 C; 236/46; 165/12

[56] References Cited
UNITED STATES PATENTS

| | | | |
|---|---|---|---|
| 3,008,694 | 11/1961 | Todd | 165/42 |
| 3,072,176 | 1/1963 | Sunday | 237/12.3 C X |

*Primary Examiner*—William E. Wayner
*Attorney, Agent, or Firm*—Robert E. Breidenthal

[57] ABSTRACT

An automobile heating system that includes a gasoline fueled heater or burner that operates for a heating cycle of adjustably predetermined duration that is selectively initiated by a lock timer or by a remote radio control. The heater is in heat exchange with the engine liquid coolant system, and during heater operation, a pump is energized to circulate heated liquid through the conventional heater (liquid-air heat exchanger) and the fan of the latter is also driven. At least a portion of the hot exhaust gas of the burner is passed in heat exchange relation with the automobile electric storage battery to warm the latter for improved performance in cold engine starting.

12 Claims, 11 Drawing Figures

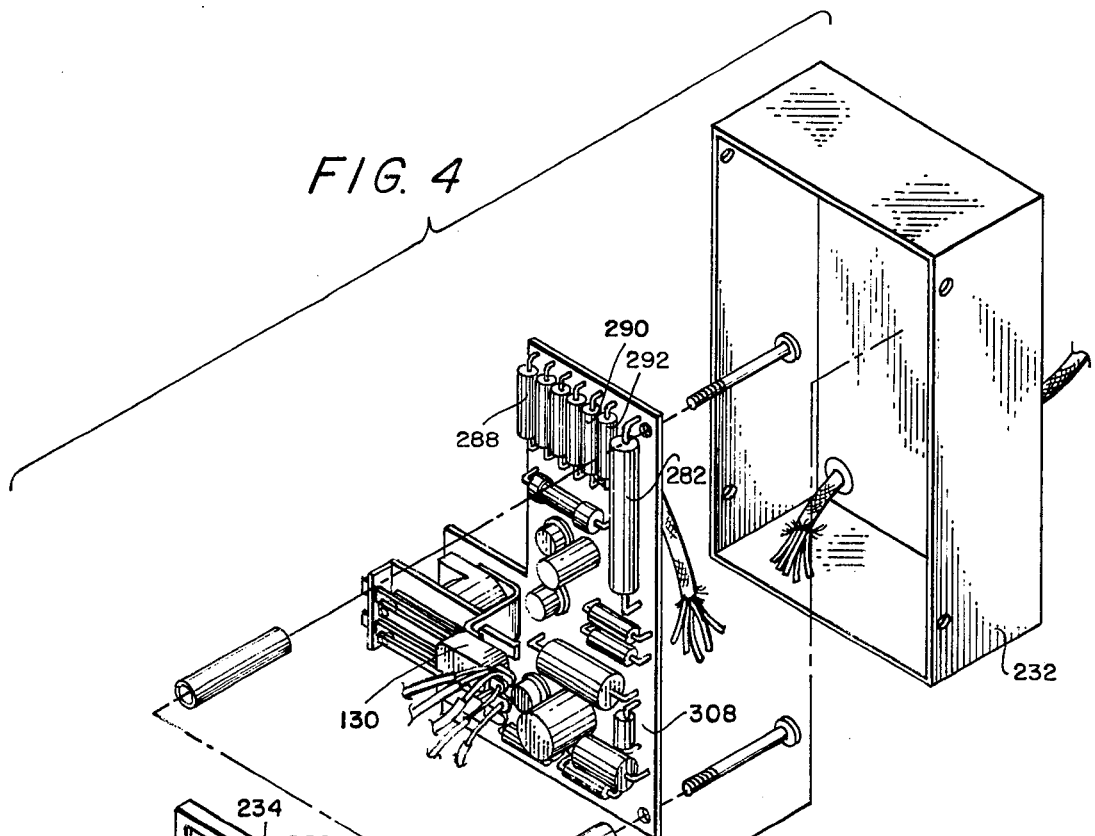
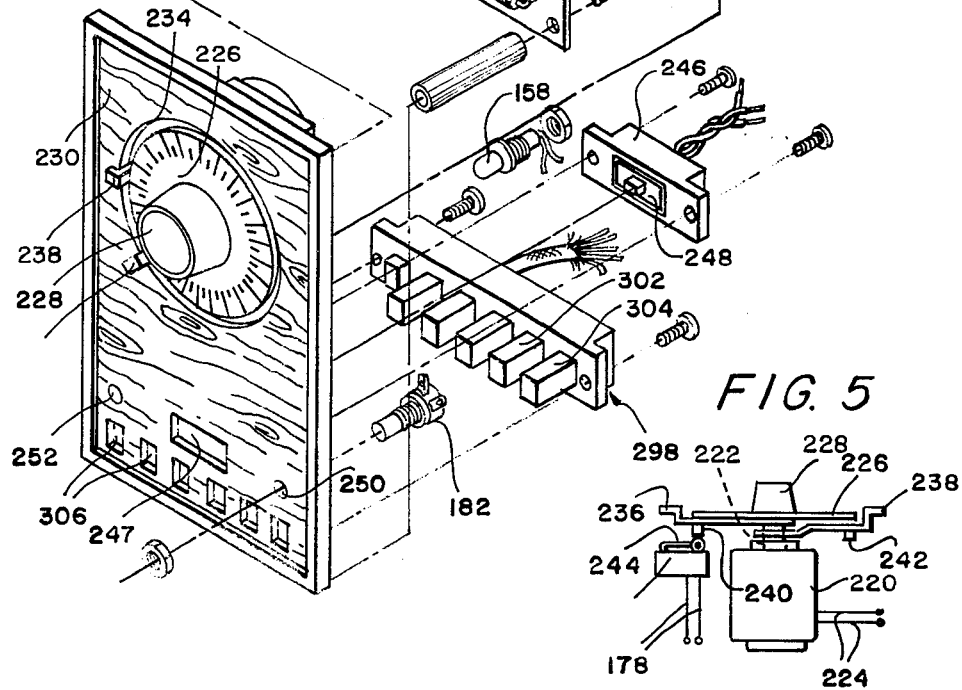

AUXILIARY AUTOMOBILE HEATER

This is a continuation of Application Ser. No. 253,467, filed May 15, 1972, now abandoned.

The present invention relates to new and useful improvements in apparatus for readying motor vehicles, such as automobiles, in cold weather for easier and more efficient starting and for prewarming the interior of the operator enclosure. More particularly, the invention pertains to apparatus which can selectively be caused to initiate a heating cycle of adjustably predetermined duration by temperature sensing means, remote radio control, direct manual control, or by a spring or electrically powered (AC or DC) timer control operative for one or more adjustably predetermined times each twenty-four hours on a daily basis, with each heating cycle involving heating the interior of the operator enclosure, heating and circulating heated liquid engine coolant through the engine to heat the latter, and heating the electric storage battery to increase the output of the latter during use of the electric starter to start the engine.

A background appreciation of the art to which the present invention appertains may be obtained upon making reference to U. S. Pat. No. 3,131,864 entitled Automobile Preheater which issued May 5, 1964 to Young; U.S. Pat. No. 2,475,166 entitled Time Controlled Heating System For Motor Vehicles which issued July 5, 1949 to Vanerca; U.S. Pat. No. 2,495,857 entitled Liquid Fuel Burning Heater and Damper Control which issued Jan. 31, 1950 to Massare; and, U.S. Pat. No. 2,654,826 entitled Antifreeze Heater which issued Oct. 6, 1953 to Spurlin.

The paramount object of the invention is to provide a motor vehicle of the type having a liquid cooled internal combustion engine as its prime mover and which normally employs waste engine heat to heat the interior of the operator's enclosure by a system involving heat exchange with the liquid engine coolant, with an auxiliary heater or burner means that burns fuel supplied for the engine for heating both the interior of the operator's enclosure and the engine by heating the liquid coolant and effecting a heat exchange between such heated collant liquid and the interior of the enclosure and the engine.

Another important object of the invention in accordance with the preceding object is to enable selective control of operation of the heating means by a manual means, a clock timer means, and by remote radio control means.

Another important object of the invention is to provide apparatus that will effect heat exchange between the combusiton products of the heater or burner means and the electric storage battery whereby waste heat of the heater serves to raise the temperature of the battery for more effective operation of the latter.

Another paramount object of the invention is to provide means for preheating a motor vehicle wherein such means can be selectively controlled to initiate a heating cycle of adjustably predetermined duration by a manually actuated means, a clock timer means, or by a remote radio control.

Still another important object of the invention is to provide a heating means that will heat the passenger compartment, the engine block, and the storage battery with such a heating cycle being initiated upon the occasion of the temperature of some part of the heated system falling to a preselected lower level with such heating cycle being terminated upon the temperature rising to a preselected upper limit.

A broad aspect of the present invention involves, in an internal combustion engine propelled vehicle having an electric storage battery, and a conventional liquid engine coolant system that includes a liquid circulation loop through the engine and in which loop is disposed a liquid-air heat exchanger for heating air moved therethrough by an electric fan, the combination therewith of an electrically operated gasoline burner means for heating liquid in said loop, pump means for circulating liquid heated by the burner means through the loop, whereby heat is delivered to the heat exchanger for heating air moved therethrough and to the engine by circulated liquid, and control means for concurrently operating the burner means, the pump means and electrically energizing the electric fan from the battery.

Another aspect of the invention involves, in combination with that set forth in the preceding paragraph, the provision of means for passing the combustion products of the burner means into heat exchange relation with the battery for warming the latter.

Another broad aspect of the invention involves, in an internal combustion engine propelled vehicle having an electric storage battery, and a conventional liquid engine coolant system that includes a liquid circulation loop through the engine and in which loop is disposed a liquid-air heat exchanger for heating air moved therethrough by an electric fan, the combination therewith of an electrically operated gasoline burner means for heating liquid in said loop, pump means for circulating liquid heated by the burner means through the loop, whereby heat is delivered to the heat exchanger for heating air moved therethrough and to the engine by circulated liquid, and control means for concurrently operating the burner means, the pump means and electrically energizing the electric fan from the battery, with said control means including initiating means for commencing operation of the burner means, and timer means for thereafter maintaining the burner means in operation for a predetermined time interval, said initiating means including a clock controlled electric switch operatively connected to initiate operation of the burner means on closure.

An important feature of the present invention resides in the provision of an electronic timer means totally apart from the clock timer, such electronic timer means being such that the time constant of a resistance-capacitance network determines the duration of a heating cycle, and in a manner independent of the clock timer.

Another important feature of the invention is that the conventional liquid-air heat exchange-type heater, including the electric fan thereof, serves its usual and normal function of heating the operator's enclosure by way of waste engine heat and additionally serves such heating function by way of the heat output of the burner means. Furthermore, such two sources of heat, namely, waste engine heat and burner output heat can be concurrently employed for accelerated heating, as well as separately employed.

Another important feature of the present invention resides in the pump means for circulating burner heated liquid coolant being driven by the electric motor of the burner means.

These and many other objects, aspects, features and advantages of the invention will become apparent during the following description of a preferred embodiment of the invention, such description being made in conjunction with the accompanying drawings, wherein:

FIG. 1 is an isometric view of the front end section of an automobile, with parts of the engine, cover and front fender removed to reveal those portions of the invention disposed in the engine compartment, with the engine being indicated in dashed outline, and with those portions of the invention disposed rearwardly of the firewall and in the operator's enclosure also being shown in dashed outline;

FIG. 4 is an enlarged exploded isometric view illustrating the clock timer and the electronic timing unit;

FIG. 5 is a diagramatic illustration of the clock and the electric switch actuated thereby;

Figures 1, 2, 3, 9:
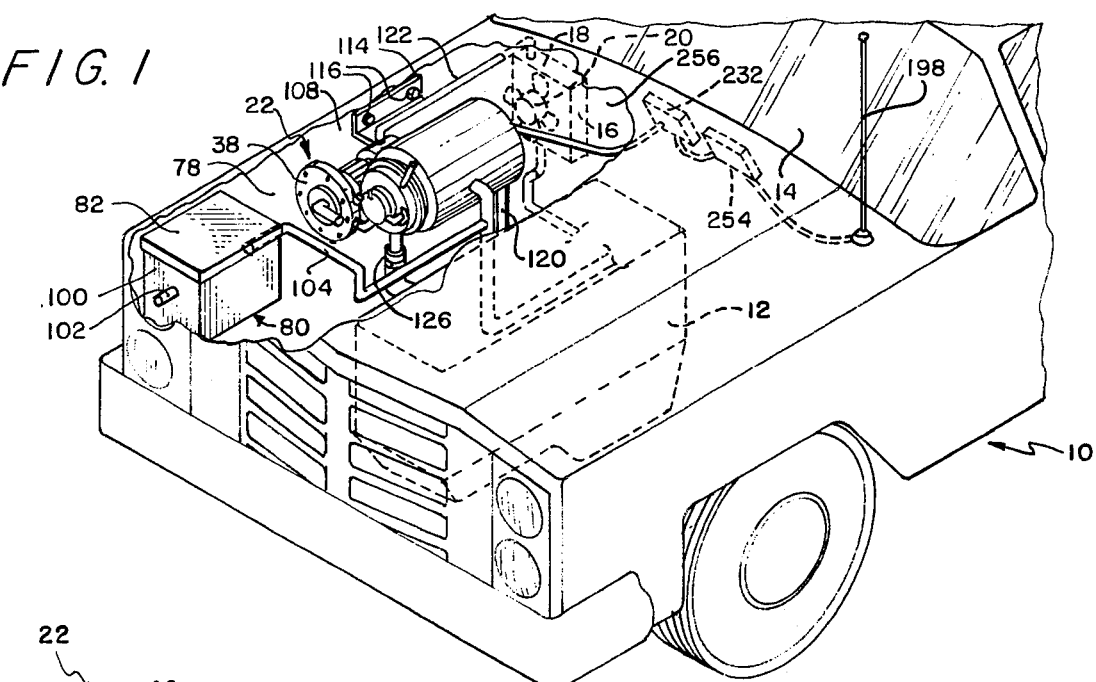
FIG. 2 is an enlarged side elevational view of the burner means with portions of the inner and outer shells of the liquid coolant jacket being broken away to illustrate the interior of the combustion chamber and its heat exchange relationship with coolant in the jacket.
FIG. 3 is a top plan view of the structure shown in FIG. 2, with portions of hidden structure being shown in dashed outline.
FIG. 9 is a diagramatic view of the combined electrical and liquid coolant circuits of the invention.

Referring initially to FIGS. 1 through 9 of the drawings, wherein like parts are designated by like numerals throughout the various views, the reference numeral 10 designates generally the front end portion of a conventional vehicle or automobile that includes a liquid cooled internal combustion engine indicated in dashed lines at 12 in FIG. 1. The engine 12 is entirely conventional and includes a liquid coolant system that is entirely conventional except as hereinafter specifically described. Since the conventional liquid coolant system, which normally employs water together with antifreeze agents, rust inhibitors, etc., and which customarily includes a radiator, thermostat valve, engine driven water pump, etc., is so well known, illustration and description thereof is not necessary to a full understanding of the instant invention and is therefore omitted.

The conventional liquid coolant system usually includes provision for circulating engine heated liquid coolant through a liquid-air heat exchanger disposed within the operator or passenger compartment or enclosure 14 of the automobile 10, whereby, in cold weather, waste engine heat can be employed to heat the interior of the enclosure 14. Such conventional liquid-air heat exchanger usually being referred to as the "heater" is designated generally at 16 and includes a fan 18 driven by an electric motor 20.

The conventional liquid coolant system includes control means for selectively directing engine water pump circulated liquid through the heater 16 and for energizing the motor 20 to drive the fan, and again such means are so well known in the art that illustration and description thereof is unnecessary and is therefore omitted. It is only necessary that it be understood that in the practice of the instant invention the conventional liquid coolant loop that includes the heater 16 is modified, as will be subsequently described in detail, to include in the loop and in series with the heater 16 a gasoline fueled means designated generally at 22 for heating and circulating coolant liquid in such loop sequentially through the heater 16 and the engine 12. Such modification is, as will be presently seen, for the purpose of producing heat and delivering the same to the heater 16 and to the engine 12, whereby heat produced by the means 22 rather than waste engine heat is employed to heat the compartment 14, and to heat the engine 12; it being noted that in heating the engine 12 in this manner the usual function of the coolant liquid is reversed, that is, such liquid delivers heat to rather than removes heat from the engine 12 in its heat exchanging circulation through the engine block, not shown, of the engine 12.

The engine 12 conventionally includes an electric ignition system and an electric starter system (neither shown) that are powered by a conventional electric storage battery 24; the latter being recharged during operation of the engine 12 by a conventional engine driven electric generator or alternator system, not shown, as will be readily understood by those skilled in the art.

The means 22 for heating coolant liquid and circulating coolant liquid through the heater 16 and the engine 12 comprises an electrically actuated and controlled gasoline fueled burner or heater means 26 that is of a conventional, widely used, and well known construction that has been modified as presently explained to incorporate a water jacket (whereby the means 26 heats coolant liquid in the jacket rather than air in the customary use of the unmodified apparatus for heating a vehicle operator's enclosure), and to incorporate a pump for circulating liquid through the jacket.

The burner means 22 is basically comprised of a conventional gasoline fueled hot air heater such as marketed by Stewart Warner Corporation. As mentioned previously, the structure and function of such gasoline fueled hot air heaters is well known, and except for the modifications made thereof in the practice of the present invention, it is not necessary to illustrate and describe such old and well known apparatus in detail in order to obtain a full and complete appreciation of the present invention.

Briefly, the gasoline fueled burner 26 includes a fuel-air mixing section 28 that introduces a combustible mixture into a generally cylindrical combustion chamber 30 surrounded in part by a cylindrical wall 32 and an end wall 34, with ignition of the mixture being effected by a spark plug 36. Air is forced into the section 28 by an air blower 38 driven by an electric motor 40, such motor having a shaft 42 extending therethrough, with the forward end of the shaft 42 being connected to the blower 38 and with the rearwardly extending portion of the shaft 42 extending through and being drivingly connected to a conventional fuel pump 44, a conventional electric switch actuator 46 (that serves a function analogous to the distributor points or breaker switch of n engine ignition system), and a liquid pump 48 of a conventional vane or centrifugal type.

The fuel pump 44 has its inlet connected by a line 50 to the gasoline supply system, not shown, of the engine 12, and the output of the fuel pump 44 is connected by a line 52 to a conventional electrically operated fuel spray unit 54 which serves on energization to admit gasoline to the section 28 and also to form such admitted gasoline as a spray for efficient mixing with air from the blower 38.

The switch of the switch actuator unit 46 is conventionally coupled to a coil 56 to pproduce high voltage electric pulses that are fed by a high tension electric cable 58 to the spark plug 36.

The structure and relationship of the elements 28, 36, 38, 40, 44, 48, 50, 52, 54 and 56 are entirely conventional and such that on electrically energizing the electric motor 40, the actuator or breaker switch 46 and the sprayer 54, an ignited fuel-air mixture is introduced into the combustion chamber 30.

Deenergization of the sprayer unit 54 will result in cutting off the introduction of gasoline to the mixing section 28, whether or not the motor 40 is deenergized. The sprayer 54 is energized by an electric circuit that includes a lead 60, and as will be presently explained such lead 60 is provided with a normally closed thermostatic switch 62 whereby the sprayer unit 54 may become deenergized to stop the heating function of the means 22 even when the latter as a complete assembly may be electrically energized. Normally, as will be understood, electrical energization of the means 22 will result in fuel combustion occurring in the chamber 30 together with operation of the liquid pump 48; however, when the switch 62 opens, fuel ceases to be introduced to the section 28 though operation of the motor 40 and the pump 48 driven by the motor 40 continues. When the means 22 is electrically deenergized, all operation of the means 22 ceases.

As will be abundantly evident to those familiar with the art, the means 22 differs from extant equipment solely in the provision of the same with the pump 48 driven by the motor 40 thereof and the modification thereof to adapt the same to heat liquid rather than to heat air.

The means 22 as modified in accordance with the present invention includes a shell or jacket spaced about the combustion chamber 30 and in liquid tight connection to the forward end of the wall 32, such shell being constituted of a cylindrical wall 64, an end wall 66, and an annular end wall 68 connecting between the walls 32 and 64 as best shown in FIG. 2. The walls 32, 34, 64, 66 and 68 are preferably of welded steel construction. A space 70 is defined between the walls 34 and 36 and an annular space 72 is defined between the walls 32 and 64, with such spaces 70 and 72 communicating with each other and being adapted to contain a liquid 74 in heat exchange relationship with the combustion chamber 30 through the separating or intervening (and incidentally heat conductive) walls 32 and 34.

Combustion products are exhausted from the chamber 30 by an exhaust pipe 76 opening thereinto through the walls 64 and 32 to both of which it is sealingly welded. The exhaust pipe 76 extends downwardly to the bottom of the engine compartment 78 and thence rearwardly as shown in FIG. 1 to discharge combustion products to the atmosphere.

Notwithstanding the heat exchange relationship between the chamber 30 and the liquid 74, the combustion products discharged by the pipe 76 will be at least very warm and typically can be expected to have a temperature of at least 180° F. and usually more closely approaching 212° F., it being noted that the combustion products will have a temperature greater than the temperature at which it is desired to circulate liquid through the heater 16.

Use of the substantial amount of sensible heat remaining in the combustion products is made in the heating of the electric storage battery 24 rather than wasting the same, it being well known that the operation of an electric storage battery is seriously and adversely affected when the battery is very cold, and the result is most disadvantageous in attempting to supply heavy electric loads such as imposed by use of the electric engine starter system.

For the purpose of heating the battery 24 there is provided a metal housing 80 that includes a cover 82 detachably secured by threaded fasteners 84. The overall dimensions of the housing 80 are greater than those of the battery 24 so as to provide a space 86 therebetween. The housing 80 also includes a bottom wall 87 on which is fixedly mounted an open battery support frame 88 of rectangular configuration such as to support the battery 24 in spaced relation above the wall 87. The frame 88 includes upstanding battery securing means or clamps 90 for releasably securing the battery 24 to the frame 88 in a substantially conventional arrangement. Terminals 92 and 94 of the battery 24 are connected to insulated electrical cables 96 and 98 that extend through a suitable opening, not shown, in the housing 80.

The front wall 100 of the housing 80 is provided with a discharge pipe 102 opening thereinto, and a conduit 104 (constituting a branch of the exhaust pipe 76) connects between the pipe 76 and the interior of the housing 80 through an opening 105 in the rear wall 106 of the housing 80. The arrangement is such that a portion of the hot combustion products from the chamber 30 is passed into the space 86 and therein circulates about the battery 24 and finally passes from the housing 80 to the atmosphere via the pipe 102. During passage of the hot combustion products through the housing 80 in the space 86, the gases serve to warm and raise the temperature of the battery 24. The housing 80 is provided with a mounting bracket 107 fixed thereto that is in turn fixed to a structural element 108 of the automobile 10.

The previously described normally closed thermostatic switch 62 is mounted on the wall 64 and has its temperature sensing portion 110 projecting into the space 72 so as to be responsive to the temperature of the liquid 74 therein so as to open the switch 62 whenever the temperature of the liquid 74 exceeds a predetermined temperature which may conveniently be on the order of 180° F. to 200° F.

The burner means 22 is suitably mounted on the automobile structural element 108 such as by a strap 112 fixedly connecting the burner means to the element 108 and by a bracket 114 fixed to the burner means 22 and connected to the element 108 by fasteners 116.

The outer wall 64 of the means 22 is provided with a discharge fitting 118 which is coupled by a hose 120 to the inlet of the pump 48, and the outlet of the pump 48 is connected by a hose 122 to the inlet of the heater 16. The outlet of the heater 16 is connected in the usual manner to the engine 12 by a hose 124. In lieu of te usual engine connection of the engine 12 to the inlet of the heater 16, the engine coolant system is connected by a hose 126 to an inlet fitting 128 on the wall 64. In other words, the spaces 70 and 72 and the pump 48 are simply interposed in a conduit system that would normally connect directly between the engine 12 and the inlet of the heater 16.

It will be understood from the foregoing that whenever the burner means 22 is electrically energized that liquid coolant will be circulated by the pump 48 about a loop that includes the hose 122, the heater 16, the hose 124, the engine 12, the hose 126, the spaces 70 and 72 wherein the same is heated, and thence to the pump 48 via the hose 120. Such loop is common to the same path traversed by coolant liquid during conventional utilization of engine waste heat to heat the enclosure 14 of the automobile 10. It will be noted that since the pump 48 is not of the positive displacement type, but rather of the vane or centrifugal type, the pump 48 will not, when idle, constitute a substantial obstacle to the flow or circulation of coolant liquid when the liquid engine cooling system is employed in the conventional manner to heat the enclosure 14 from the heater 16. Therefore, the enclosure 14 of the automobile 10 can be heated by operation of the conventional heater 16 by the circulation of heated coolant liquid therethrough, when such heating of the coolant liquid is effected by application of waste engine heat in the customary manner with circulation being by operation of the engine driven water pump, and/or such heating of the coolant liquid is effected by the means 22 with circulation being by operation of the pump 48.

Needless to say, when the conventional heater 16 controls, not shown, are employed in the usual manner to effect heating of the enclosure 14, the motor 20 is energized from the battery 24. It should be noted that such motor 20 is energized concurrently whenever the means 22 is energized from the battery 24 by means yet to be described of such character that energization of the motor 20 in the customary manner will not result in energization of the means 22.

Initiating means are provided for initiating operation of the means 22 in conjunction with a timing means being provided for maintaining the means 22 in operation for an adjustably predetermined interval after such initiation to constitute a heating cycle. These means are such that a heating cycle cannot be initiated during a heating cycle.

The initiating means is such as to be caused to operate in response to a clock, a manual control, and a remote radio control. Directing attention particularly to FIG. 8, the initiating means comprises a relay outlined in dashed outline 130, such relay 130 including a solenoid 132 and a pair of normally open switches 134 and 136. The negative terminal of the battery 24 is connected to ground 138, as shown, and the positive terminal of the battery 24 is connected to the terminals of the movable contact elements of the switches 134 and 136 by leads 140 and 142 with a switch 144 interposed in the lead 142. The means 22, which is grounded by lead 146, is connected to the stationary contact element of the switch 136 by a lead, the arrangement being such that the burner means 22 is energized by the battery 24 whenever both of the switches 136 and 144 are closed. The burner means 22 will also be electrically energized whenever a switch 148 is closed, the latter being interposed in a lead 150 connected between the positive battery terminal lead 140 and the fixed contact element of the relay switch 136.

The electric motor 20 of the heater 16 is disposed in electrical parallel with the burner means 16 by a lead 152 for concurrent energization therewith. A unidirectional current device such as a silicon diode 154 is disposed in the lead 152, so that a positive voltage can be applied to the positive terminal of the motor 20 (on the cathode side of the diode 154) to operate the heater fan 18 in the customary utilization of waste engine heat without energizing the burner means 22 by the application of such positive voltage.

An indicator lamp 158 is disposed in electrical parallel with the burner means 22 by a lead 160 for concurrent energization. The lamp can be located within the view of the operator or driver of the automobile 10 to serve as a visual indication that the burner means 22 as well as the heater motor 20 are energized.

The switch 148 is of course not merely a means for initiating operation of the burner means 22, but is such as to cause continuous energization of the burner means 22 as long as the switch 148 is closed. Accordingly, the switch 148 is a control complete in and of itself that is compatible with the initiating means per se.

The initiating means entails circuitry in electrical series with the switch 144 that is effective to energize the solenoid 132 and thereby close the relay switches 134 and 136. This circuitry comprises one terminal of the relay solenoid 132 being connected by a lead 162 to a ground lead 164. The other terminal of the solenoid is connected by leads 166 and 168 to one terminal 170 of a two-terminal network comprised of a resistor 172 in parallel with a capacitor 174. The other terminal 176 of such network is connected to the lead 142 and the movable contact element of the switches 134 and 136 by a lead 178, with a timer clock actuated switch 180 being interposed in the lead 178. As clearly shown, a normally open push button electric switch 182 is connected to the lead 178 in electrical parallel with the clock switch 180, and additionally, the normally open relay switch 184 of a relay 186 is also connected to the lead 178 in electrical parallel with the clock switch 180 and the push button switch 182.

The arrangement is such that when the switch 144 is closed and any one of the switches 180, 182, or 184 is then closed, a pulse of direct current will pass through the solenoid 132 sufficient to cause closure of the relay switches 134 and 136. While such pulse or surge of direct current will effect closure of the switches 134 and 136, the current will diminish to a value insufficient to maintain the switches 134 and 136 as the resistor 172 has such a high value of resistance as to limit the current therethrough to a value less than the holding current of the relay 130. The capacitor 174 has a sufficiently high value of capacitance as to permit a high current therethrough on initial closure of the switches in electrical series therewith. As mentioned previously, the initiating means can be remotely controlled by radio, and indeed the relay switch 184 constitutes an operating component of such radio control system. The remote radio control system comprises a conventional radio transmitter 190 of the type that has a self-contained battery power supply that can be keyed on by closure of a normally closed push button switch 192. Such radio transmitter 190, which can be of the AM or FM type, is such that, when keyed on by closure of the switch 192, it will emit or radiate radio signals by its antenna 194 that are tone modulated.

The tone modulated radio signals propagated from the transmitter antenna will travel through space along a path such as indicated at 196 to be picked up by the antenna 198 of a radio receiver 200. The receiver 200 is tuned to the frequency of the signal transmitted by the transmitter 190, and serves to demodulate the signal to produce the tone an an output by an audio amplifier 202 connected to the receiver 200 by an electric cable 204, and such amplified tone is connected to a rectifier 206 by leads 208 with the rectified output of the rectifier being fed by leads 210 to the solenoid 212 of the relay 186. The receiver 200 has a grounded lead 214 and is powered by a lead 216 connected to the positive terminal of the battery 24. Power for the amplifier 202 is obtained from the receiver 200 by a power cable 218. The power drain of the receiver 200 by a power cable 218. The power drain of the receiver 200 and the amplifier (both of which and the rectifier 208 are preferably solid state so as not to require tube filament current) is so low, especially in the absence of a tone modulated signal from the transmitter 190, that the same are operated continuously or at least continuously when there is a reasonable likelihood of needing to operate the burner means 22.

The operation of the remote radio control will be readily appreciated. A person remote from the automobile 10 and having the transmitter 190 conveniently accessible to him will on desiring to initiate operation of the burner means 22 simply close the switch 192 momentarily. Such closure of the switch will normally be effected manually, but those skilled in the art will understand that such closure or the electrical equivalent thereof can be effected by any suitable timing device if desired. On such momentary closure of the switch 192, a tone modulated radio signal will be radiated from the antenna, and such signal will be picked up by the antenna 198 provided the antennas are not too distant from each other considering such obstacles to radio waves as may be disposed therebetween. Effective radio communication or linkage will exist between the antennas (even when the transmitter is of very low power) for hundreds of feet and possibly for hundreds of yards even when the transmitter is within an ordinary frame or brick house, or will be particularly good out in the open as from a boat or snowmobile, etc.

On reception of the tone modulated signal the combination of the receiver 200, the amplifier 202 and the rectifier 206 will be effective to pass a sufficiently large current through the relay solenoid 212 as to close the relay switch 184. Such closure of the relay switch 184 for the brief interval of the closure of the switch 192 will have the same effect as closure of either of the switches 180 and 182, and will result in initiation of operation of the burner means 22, provided that the switch 144 is closed.

It will be obvious that manual closure of the switch 182 will produce the same effect as that of the above described effect of closure of the relay switch 184.

The switch 180 is clock actuated and as will be seen on reference to FIGS. 4 and 5 comprises a clock means 220 of a well known electro-mechanical character such as to be electrically powered from a direct current source to operate a mechanical clockwork mechanism having a rotatable output shaft 222. The clock means 220 is interposed in a lead 224 connected between the battery ground and the positive battery terminal, whereby the clock means 220 is electrically powered. The output shaft 222 is driven at a constant angular velocity by the clock means 220 to complete one rotation per 24 hours. The outer end portion of the shaft 222 is conventionally provided with a calibrated dial disc or plate 226 and a setting knob 228 for adjusting the angular position of the disc 226 on the shaft 222. The clock means 220 is suitably mounted on the inner side of the front panel 230 of a control box 232, and the calibrated disc 226 is exposed to the front of the panel 230 through an opening 234 in the latter.

A pair of cam arms 236 and 238 are rotatably mounted on the shaft 222 and such arms are frictionally engaged with the disc 226 to rotate with the latter. The frictional engagement of the cam arms 236 and 238 is such that each of them can be manually forced to selected angular positions relative to the disc 226, and may be disposed if desired in close angular proximity to each other. The cam arms 236 and 238 are provided with integral camming portions 240 and 242, respectively, that are arranged to cam the actuating arm 244 of the switch 180, which is of the nature of a normally open microswitch. FIG. 5 illustrates the cam arm 236 in camming engagement with the switch actuating arm 244 and closing the switch 180. For any given adjustment of the cam arm 136 relative to the disc 226, the switch will be closed for a short interval of time every 24 hours, and the same is true with respect to the arm 238. For example, the arm 236 can be set so that the switch 180 is closed for a brief interval at 6:45 A. M. every day (such as shortly prior to a daily early morning use of the automobile 10), with the arm 238 being set so that the switch 180 is closed for a brief interval at 4:45 P.M. every day (such as shortly prior to a daily afternoon use of the automobile 10). The relative dimensions of the camming portions 240 and 242 and of the actuating arm 244 are such that when the cam arms 236 and 238 are angularly juxtaposed, the switch 180 will be closed a single time during each 24 hours, so that only one heating cycle is performed each 24 hours as will be presently explained.

Figure 8:
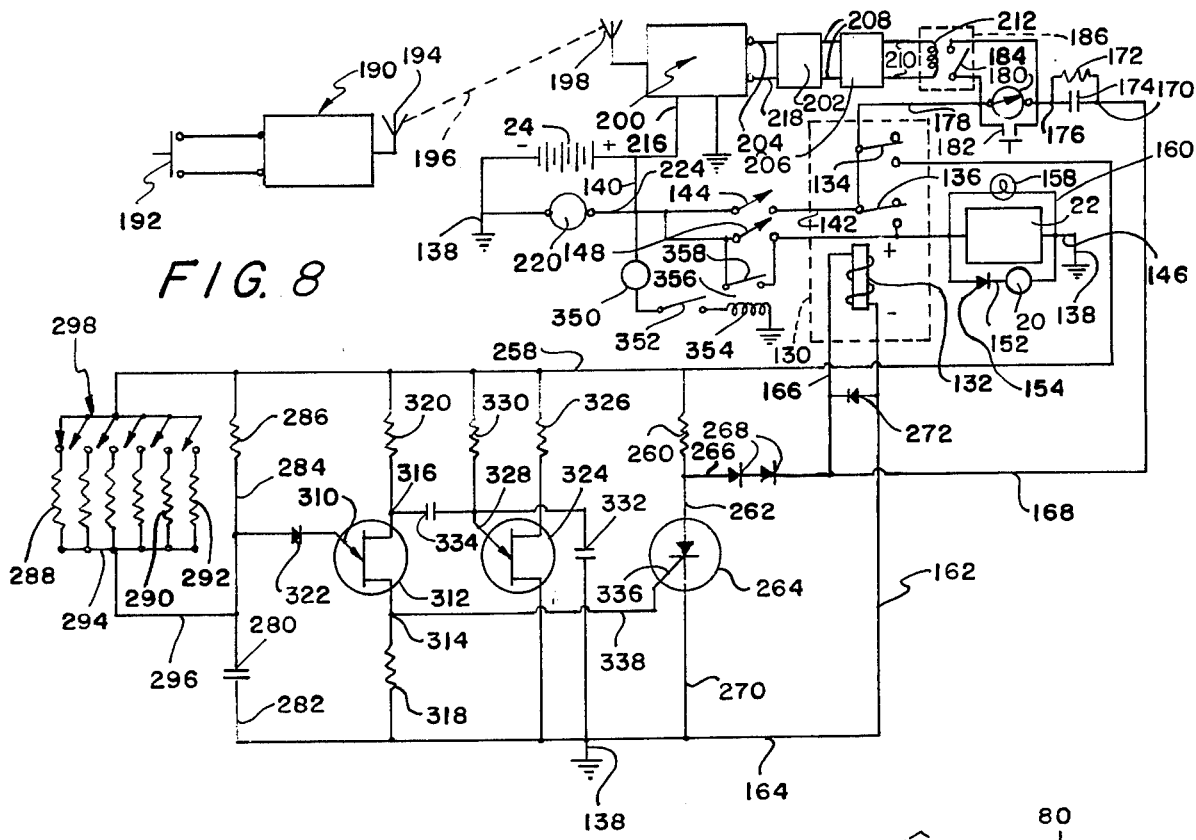
FIG. 8 is a schematic diagram of the electrical system for controlling the initiation of and the duration of a heating cycle.
Figure 6:
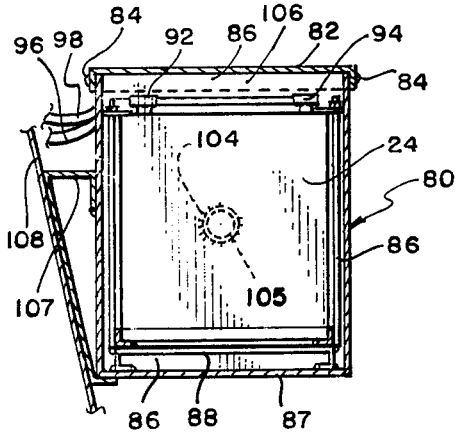
FIG. 6 is an enlarged vertical sectional view of the combustion product jacket disposed about the storage battery which is shown in full lines therein.
Figure 7:
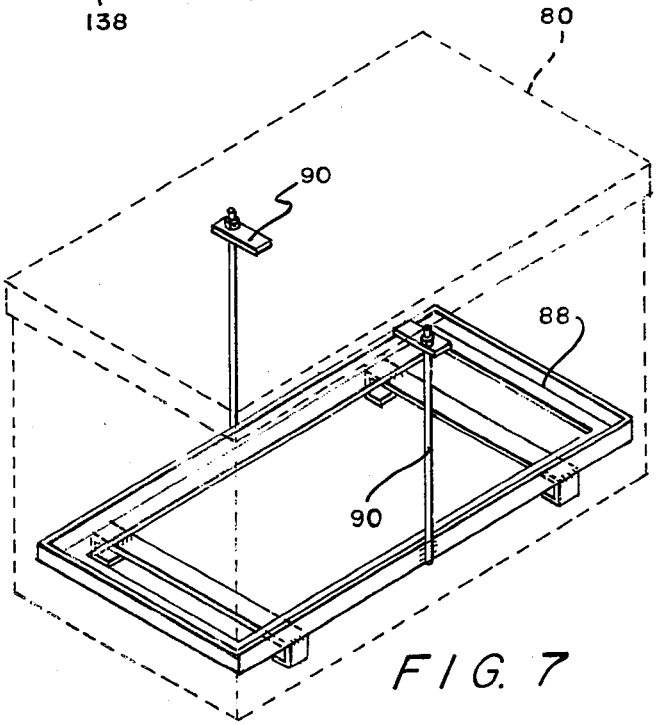
FIG. 7 is an enlarged isometric view of the battery support and securing means that are fixed to and disposed in the combustion jacket shown in dashed outline.

A slide switch control mechanism 246 is mounted in the lower front portion of the panel 230 in an opening 247, the same including a manually actuable slide element 248 which controls the switches 144 and 148. The arrangement is such that when the element 248 is centered, both of the switches 144 and 148 are open as shown in FIG. 8. Movement of the element to the left of its center or off position to what may be termed the automatic position closes the switch 144 (switch 148 remaining open), with movement to the right of its center position to what may be termed the manual position closes the switch 148 (switch 144 remaining closed).

The push button switch 182 is mounted in an opening 250 in the panel 230, and the indicator lamp 158 is mounted in an opening 252 in the panel 230. The control box 232 itself and its contents, some of which are yet to be described, are mounted on or attached to the instrument panel, not shown, of the automobile 10.

The radio receiver 200, the amplifier 202, the rectifier 206 and the relay 186 are disposed in a cabinet 254 mounted on the rear side of the fire wall 256, with the receiving antenna 198 being preferably mounted on the exterior of the automobile 10 as shown.

The means for maintaining the burner means 22 in operation for an adjustably predetermined time following initiation of operation thereof by actuation of the relay 130 will now be described.

Actuation of the relay 130 as caused by closure of any of the switches 180, 182 or 184 (the switch 144 being closed) serves to close the switch 134 in addition to the switch 136. Such closure of the switch 134 applies the full positive voltage of the battery 24 to a lead 258 as will be clear on inspection of FIG. 8. The lead 258 is connected through a resistor 260 to the anode connection 262 of a silicon controlled rectifier (SCR) 264, and such anode connection 262 is connected to solenoid supply leads 166 and 168 by a lead 266 in which silicon diodes 268 are placed in series. The cathode of the SCR 264 is connected to the ground lead 164 by a lead 270.

Assuming the SCR 264 to be in its off state and that the relay 130 has been actuated to close the switch 134, a circuit is completed through the solenoid 132 that will pass sufficient current to maintain the relay switches 134 and 136 closed until the SCR 264 is in its on state, such circuit existing between the leads 256 and 164 and including in series the resistor 260, the diodes 268, the solenoid 132 and the lead 162. The resistor 260 has a resistance value relatively close to but less than that which would reduce the current through the circuit just described to the current level through the solenoid 132 required to keep the switches 134 and 136 closed.

Such current flow through the resistor 260, the diodes 268 and the solenoid will continue and therefore keep the switches 134 and 136 closed until the SCR 264 is gated into its on state.

When the SCR 264 is gated into its on state, current flows from the lead 258 to the ground lead 164 through the resistor 260 (which serves to limit the current) and the SCR 264, with the voltage of the SCR anode connection 262 being sharply reduced to a value of about one volt above ground. Such low voltage of the anode connection 262 is insufficient to maintain holding current for the relay 130 through the solenoid 132, particularly in view of the forward voltage that is required to cause forward current through the series connected silicon diodes 268. In order to prevent potentially harmful voltage transients or inductive kickback from the solenoid 132 on firing the SCR 264, a silicon diode 272 is connected across the solenoid 132 and between the leads 162 and 166 to provide what is commonly called a free wheeling action.

With such deenergization of the solenoid 132, the switches 134 and 136 are opened to disconnect the lead 258 from the battery 24, and to deenergize and stop operation of the burner means 22.

In view of the foregoing, once the relay 130 is actuated by closure of any of the switches 180, 182 and 184 to initiate operation of the burner means 22, the relay 130 will remain actuated to continue operation of burner means 22 until such time as the SCR 264 is fired or gated to its conductive on state.

Means is provided for gating the SCR 264 to its on state an adjustably predetermined time interval after the instant that relay 130 is actuated to close the relay switch 134. Such means is a circuit of the character known as a time delay circuit and is of the same general type and operates on the same principles as those shown and described on pages 320–323 of the *Transistor Manual*, 7th (light-weight) Edition, published in 1964 by The General Electric Company; particularly FIG. 13.32 on page 322 as applied to gate an SCR.

The time delay circuit comprises a low leakage capacitor 280 having one terminal grounded by a lead 282 and its other terminal connected to the lead 258 by a lead 284 in which is interposed a resistor 286. A plurality of resistors such as those indicated at 288, 290 and 292 are provided and connected by leads 294 and 296 to the lead 284 intermediate the capacitor 280 and the resistor 286. Any selected one of the resistors 288, 290 and 292 can be electrically connected to the lead 258 so that such selected resistor is in electrical parallel with the resistor 286 by use of a conventional selector switch means 298, preferably of the multiple push button type shown. The selector switch 298 includes push buttons such as shown at 300, 302 and 304 which respectively are associated with resistors 288, 290 and 292. The operation of the selector switch 298 and its relationship to the resistors 288, 290 and 292 will be readily understood. Depression of the selector push button 300 operates to connect the resistor 288 to the lead 258 as shown in FIG. 8. Subsequent depression of any of the other selector push buttons serves to connect its associated resistor to the lead 258 while disconnecting the resistor 288 from the lead 258. For example, depression of the push button 302 will operate to disconnect resistor 288 while connecting resistor 290 to the lead 258.

The selector switch means 298 is mounted on the rear of the panel 230 with the push buttons thereof extending through a plurality of appropriately located openings in the panel 230, such as those indicated at 306. The time delay circuit as well as the relay 130 are conveniently disposed in the control box 232, with some of the components, such as the resistors 288, 290 and 292, the capacitor 282, and the relay 130 being mounted on a circuit board 308. The assembly of the box 232 and its contents will be evident on inspection of FIG. 4.

Each of the six resistors 288, 290 and 292 have different values, and the resistive value of such one of these as selected by the switch 298 and the value of the resistor 286 in parallel therewith and the capacitive value of the capacitor 280 in series therewith between the leads 258 and 164 determines the rate at which the voltage existing on the lead 284 rises on closure of the relay switch 134. In other words, the values of the resistance 286, the selected one of the resistances 288, 290 and 292, and the capacitance 280 is determinative of a resistance-capacitance time constant. Such time constant determines the time interval required for the connection of the lead 284 connected to the capacitor 280 to increase in voltage to a value a predetermined amount less than the voltage required to be applied to the emitter 310 of a unijunction transistor 312 in order to trigger or fire the unijunction transistor. The values of the resistors 286, 288, 290 and 292 may be such, for example, in relation to the value of the capacitor 280 to provide selectable resistor-capacitor networks having time constants such that the time intervals associated with the six resistors 288, 290 and 292 may be 2, 5, 10, 15, 20 and 30 minutes in duration. Of course, within wide limits, the selectable time intervals may be of any desired range of values.

The voltage that must be applied to the emitter 310 in order to trigger the device 312 is determined by and intermediate the voltages applied to base-one 314 and base-two 316 of the latter and the internal voltage dividing characteristics of the particlar device 312 used. Base-one 314 is connected to ground lead 164 through a resistor 318, and base-two 316 is connected to the lead 258 through a resistor 320. The lead 284 connected to the positive terminal of the capacitor 280 is connected to the emitter 310 through a diode 322.

In order that high resistance values can be employed for the resistors 286, 288, 290 and 292 while retaining the capability of supplying the minimum trigger current for the unijunction transistor 312, means is provided for periodically applying negative pulses to base-two 316 of the unijunction transistor 312. Such means is in the form of a relaxation oscillator comprised of a unijunction transistor 324 having its base-one connected to the ground lead 164 as shown and having its base-two connected to the lead 258 through a resistor 326. The emitter 328 is connected to the lead 258 through a resistor 330 and also to the ground lead 164 through a capacitor 332. The relaxation oscillator constituted of the unijunction transistor 324, resistors 326 and 330, and capacitor 332 couples negative pulses produced at the emitter 328 to base-two 316 of the unijunction transistor 312 by means of a coupling capacitor 334.

As will be evident, triggering of the unijunction transistor 312 at the expiration of the adjustably predetermined time interval results in the production of a positive pulse at base-one 314 of the unijunction transistor, and such positive pulse is communicated to the gate 336 of the SCR 264 by a lead 338 so as to fire the SCR 264 and thereby deenergize the solenoid 132 and open the switches 134 and 136 as previously described.

The use of the invention will easily be understood. When the switch 144 is closed, a heating cycle can be selectively initiated by (a) momentarily closing the switch 192 of the transmitter 190 when anywhere within a reasonable distance from the automobile 10, (b) momentarily closing the switch 182 when within the automobile 10, and a heating cycle will automatically be initiated on a daily basis at a preselected time or times by arms 236 and 238 closing the switch 180. The duration of each heating cycle will depend on which of the push buttons 300, 302 and 304 has been last depressed.

No heating cycle can be initiated until after a previously initiated cycle has been concluded by reason of the operation capacitor 174 and the resistor 172.

The burner means 22 can be operated at any time for as long as desired by closing the switch 148.

While as thus far described, the apparatus will initiate, at the option of the user, a heating cycle at any preselected time by a timer (either one in the car or one at a remote location in association with the radio control transmitter), or at any time the user desires to initiate a cycle (by direct control or remotely by radio control), it will be understood that the automobile can become extremely cold prior to the initiation of a heating cycle. Since it can be desirable to prevent the automobile or some part thereof (such as the battery, the engine block, the passenger compartment, etc.) from becoming excessively cold, the invention includes the optional provision of means for controlling operation of heating means to prevent the automobile or a selected component thereof from becoming excessively cold.

Provision of such optional means is productive of a number of advantages, amongst which may be mentioned that the battery need never produce an output when excessively cold, there is a lesser likelihood of extremely cold temperatures causing damage by way of freezing of a water-containing liquid coolant, and the period of time necessary for heating when initiated by a timer or manually will tend to require a lesser and a limited duration.

The optional means will now be described, and as will be seen, the provision of such means is compatible with and enhances the results obtained by the initiation of heating cycles by timer, radio, or user control. As will be seen on reference to FIG. 8, such means comprises a temperature responsive electric switch means 350 in electrical series with an on-off electric switch 352 and a solenoid 354 of a relay 356 between ground 138 and the ungrounded terminal of the battery 24.

The relay 356 includes a normally open solenoid actuated switch 358 and the switch 358 is arranged in electrical parallel with the electric switch 148. The arrangement is such that closure of the relay switch produces the same result insofar as operation of the heater 22 is concerned as closure of the switch 148, which has already been described.

Concurrent closure of the switches 350 and 352 causes closure of the otherwise open switch 358 with consequent energization of the heater 22. The manually operated on-off switch 352 permits the user to disable operation of the heater 22 that would otherwise occur under the control of the switch 350. Such disabling may be desirable to avoid needless expenditure of engine fuel and battery energy when use of the automobile over a protracted interval is not anticipated, and the coolant liquid includes adequate antifreeze protection.

The temperature responsive switch 350 is of the well known HYDRONIC Control type which functions to close on the sensed temperature falling to a predetermined lower level, thereafter remaining closed until the sensed temperature rises to a predetermined higher temperature at which time it opens and remains open until such time as the sensed temperature again falls to the predetermined lower temperature for closure.

Temperature actuated switches of this general type are commercially available, such as devices marketed by the Minneapolis-Honeywell Company under the trademark AQUASTAT. An example of such general type of switches is a switch listed in their catalog as having the model and catalog No. L4006A1678a.

The switch 350 is preferably of the conventional type that includes provision for adjustable and independent setting of the aforementioned lower and upper temperatures. The upper temperature setting should be such relative to the temperature at which the thermostat switch 62 opens that the switch 350 will open prior to opening of the switch 62, whereby the heater 22 will not be caused to operate so as to maintain continuously the coolant at the temperature at which the switch 62 opens, that is, the operation of the switch 350 is to be such that the same will be opened, whereupon the heater 22 will be deenergized until such time that the switch 350 is closed, unless of course the heater 22 is energized in the meantime by the previously described timer or manual controls.

The temperature controlled switch 350 (or more accurately the temperature sensing element thereof, not shown) is preferably disposed in the conduit 126 as shown, that is, in the liquid coolant line through which coolant passes from the engine 12 to the heater 22. When the switch 350 is positioned in the line 126, suitable lower and upper temperature settings of the switch 350 can be at 40° F. and 150° F., though obviously, numerous other temperature setting combinations can be selected by the user.

Figure 10:
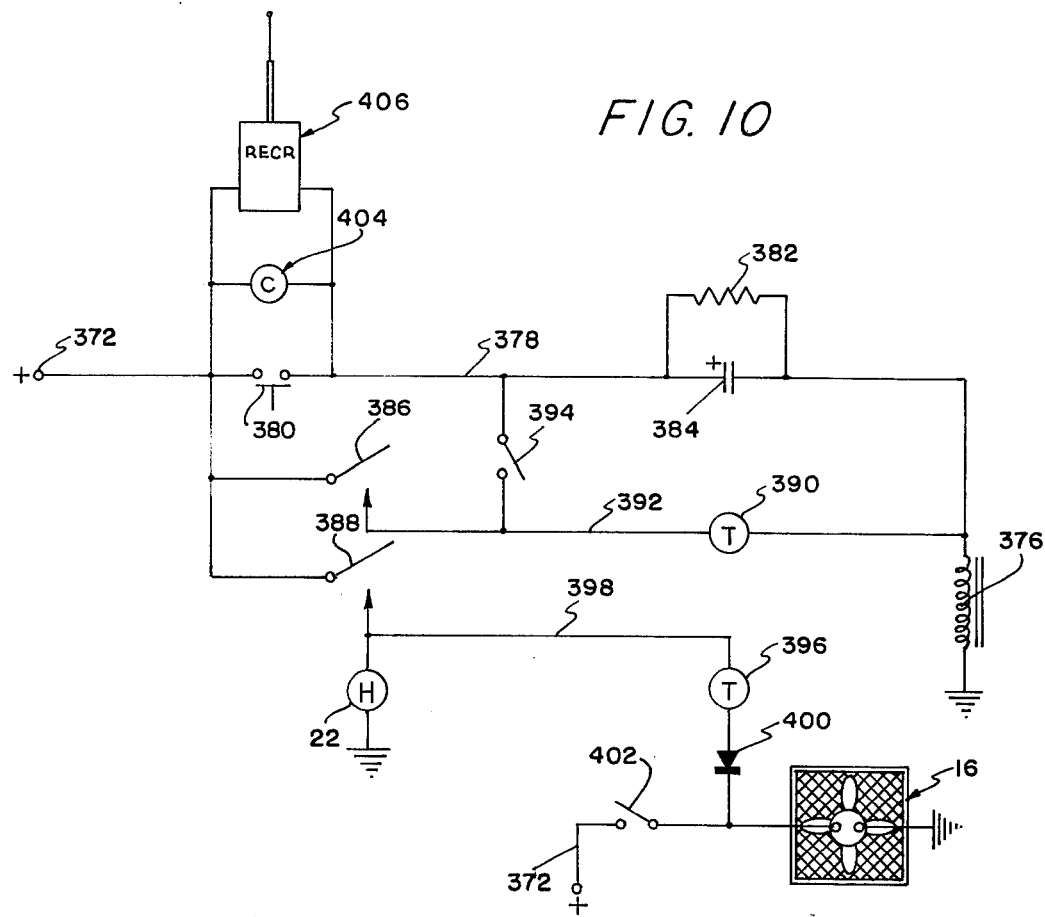
FIG. 10 is a schematic diagram of the electrical circuit of a modification of the invention; and, FIG. 11 is another schematic diagram of the modification shown in FIG. 10.
Figure 11:
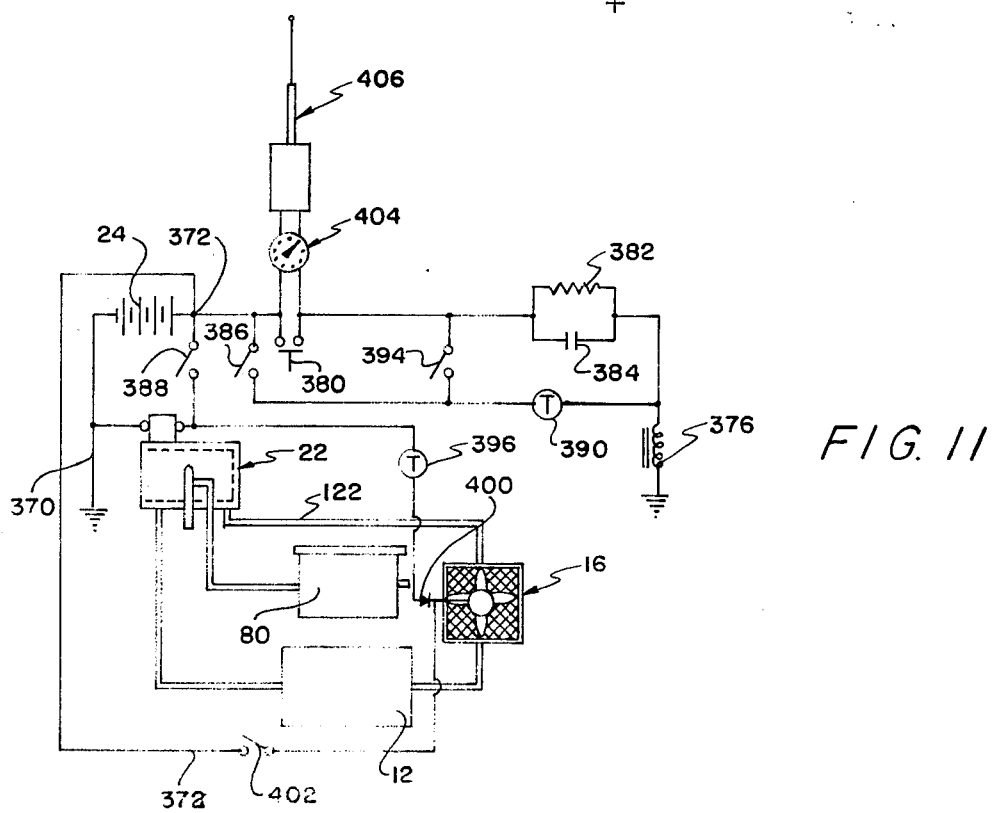

Referring now to FIGS. 10 and 11 illustrative of a modified form of the invention, it will be seen that this modified form of the invention includes some of the same elements or assemblies as included in the previously described form of the invention, and with respect to such common elements or assemblies, the same reference numerals are employed; such as, for example, the automobile engine or engine block 12, heater and electric fan assembly 16, the heater 22, the automobile electric storage battery 24, and the cover 80 for the latter.

In FIGS. 10 and 11 the battery 24 has its negative terminal grounded to the vehicle frame at 370 and its positive terminal 372 is connected to the ungrounded terminal 374 of a grounded relay solenoid 376 by a line 378 in which are serially interposed an electric switch 380 and a simple RC network comprised of a resistor 382 and a capacitor 384. The solenoid 376 is operatively associated with a pair of normally open single pole, single throw switches 386 and 388. The resistor 382 has a sufficiently high resistance to limit direct current through the solenoid 376 to a level insufficient to close the switches 386 and 388. However, the resistor 382 will serve to discharge the capacitor 384 when the latter is disconnected from the battery 24. When the capacitor 384 is discharged, and the switch 380 thereafter closed the charging current for the capacitor is sufficient in amplitude and time to cause the solenoid 376 to actuate closure of the switches 386 and 388.

On such closure of the switches 386 and 388, continued energization of the solenoid 387 sufficient to maintain such switches closed is determined by whether an electric thermostat switch 390 is closed or open, the latter being in series in a line 392 with the switch 386 between the battery terminal 372 and the ungrounded terminal of the solenoid 376. If the switch 390 is closed, the solenoid 376 is and will remain energized by a circuit through such switch 390 until the latter is opened. The switch 390 is disposed in temperature sensing relationship relative to that which the heater 22 is intended to heat, such as, for example, the interior of the passenger compartment, the coolant, etc., and the switch is such that the same will be open whenever the sensed temperature is above a predetermined upper temperature limit, and remains open, when open, until such time as the sensed temperature falls below a predetermined lower temperature limit, and remains open, when open until the sensed temperature rises to above the predetermined upper temperature limit. Thermostatic switches of such type are commercially available wherein the upper and lower temperature limits are predetermined and not adjustable, and wherein such limits can be adjusted and thereby predetermined to suit the user's personal preferences. The latter is preferred, but either type is suitable. Suitable selection of temperature levels can be easily made in the light of prior discussion, the placement of the sensing unit, and the user's personal taste.

It will be obvious that, if a switch 394 connected between the lines 378 and 392 as shown is kept open as shown, a single uninterrupted closure of the switch 380 (which can be an on-off type or a normally open push button type as shown) can at most result in one cycle of heating initiated by either the closure of the switch 380 or 390 and terminated by opening of the latter by reason of the action of the resistor capacitor combination 382 and 384; it being noted that closure of the switch 386 is accompanied by closure of the switch 388 to activate the heater system 22.

Opening of the switch 380 for a sufficient time for discharge of the capacitor 382 (through the resistor 382), enables use of the switch 380 to start another of such heating cycles provided the switch 390 is closed.

Such requirement of an opening of switch 380 before a new heating cycle can be commenced is of course quite desirable under some circumstances.

On the other hand it is often desired that the switch 386 can be closed at all times that the switch 390 is closed and the switch 394 together with the switch 380 (the latter in this case being preferably an on-off type) enables such operation. Opening of either of the switches 380 and 394 will preclude the initiation of any subsequent heating cycle until the opened switch is again closed.

Another thermostatic switch 396 is provided, the same being in electrical series in a line 398 with a diode 400 and the electric air fan assembly 16; such series being in electrical parallel with the heater means 22, so that when the latter is energized, the electric air fan 16 will also be energized provided the thermostat switch 396 is closed. It will be understood that the thermostat switch 396 (which can be the same as any of the described suitable types of switch 390) is arranged to sense the temperature of coolant circulated through the assembly 16 whereby an electric fan thereof is energized only within a predetermined range of coolant temperature, that is, whenever the coolant has risen above a predetermined upper temperature limit and until such sensed coolant temperature has fallen below a predetermined lower temperature limit.

The electric fan 16 can be driven (when the coolant circulated therethrough is heated in the conventional manner by waste engine heat) by closure of a switch 402, the latter being connected between the cathode of the diode 400 and the fan 16 from the positive battery terminal 372, whereby the diode 400 serves to electrically isolate the heater means 22 from the switch 402.

As mentioned previously, the switch 380 can be an off-on switch or a normally open push button switch. Furthermore the function of the switch 380 can be performed by a clock or timing means 404 incorporating a switch controlled thereby, not shown, in electrical parallel with or bridging the switch 380 as shown. Remote controlled radio receiver and switch means 406 also bridges or parallels the switch 380, whereby a remote radio transmitter means such as previously described can cause the means to electrically bridge the switch 380. It will be understood that the radio controlled switch means includes an electric switch (such as incorporated in the previously described embodiment of the invention) that closes in response to reception of a defined radio signal.

Referring to FIG. 11, it will be seen that, as in the case of the previously described embodiment of the invention, the exhaust of the heater 22 is passed by the pipe 104 to the jacket 80 surrounding the battery 24. The battery 24 is shown in the schematic diagram as outside the housing or jacket 80 for purposes of clarity.

We claim:

1. In an automobile having an electric storage battery and a conventional liquid engine coolant system that includes a liquid circulation loop through the engine and in which loop is disposed a liquid-air heater exchanger for heating air moved therethrough by an electric fan, the combination therewith of an electrically operated gasoline burner means for heating liquid in said loop, electrically actuated pump means for circulating liquid heated by the burner means through the liquidair heat exchanger to the engine, whereby heat is delivered to the heat exchanger and to the engine by circulated liquid, and control means for concurrently operating the burner means and electrically energizing the pump means from the battery, said control means including means for initiating operation of the burner means and means for thereafter maintaining the burner means in operation for a predetermined time interval, said last means including a direct current actuated electrical timer means connected to said battery for energization.

2. The combination of claim 1, including the provision of means for initiating operation of the burner means that includes and functions in response to a temperature actuated electric switch means.

3. The combination of claim 1, wherein said timer means is cyclic and serves to initiate operation of the burner means on a cyclic basis upon the passage of equal time intervals.

4. The combination of claim 1, wherein said timer means additionally controls terminating operation of the burner means.

5. The combination of claim 1, wherein the means for initiating and terminating operation of the burner control means additionally includes a temperature responsive electric switch means.

6. The combination of claim 5, including a second temperature responsive electric switch means for energizing the electric fan solely when the burner means is in operation.

7. The combination of claim 5, wherein the means for initiating operation of the burner means also includes a remote radio transmitter.

8. The combination of claim 1, wherein said timer means is electronic and includes a resistor-capacitor network determinative by its time constant of the time interval, and means for selectively varying the amount of resistance in the network, whereby the time constant can be varied and thereby also the length of the time interval.

9. The combination of claim 1, wherein the timer means includes a clock controlled electric switch operatively connected to initiate operation of the burner means on closure.

10. The combination of claim 9, wherein the clock is electrically powered and energized by the battery, and wherein the clock is a 24-hour clock for daily closure of the electric switch at a predetermined time.

11. The combination of claim 9, wherein the timer means also includes a normally open relay switch in parallel with the clock controlled electric switch, and radio control means operable from a remote location for energizing the relay switch closed.

12. The combination of claim 1, wherein the control means includes radio control means operable from a remote location for initiating operation of the burner means, and said timer means being operative on initiation of operation of the burner means to maintain the burner means in operation for a predetermined time interval.

* * * * *